UNITED STATES PATENT OFFICE.

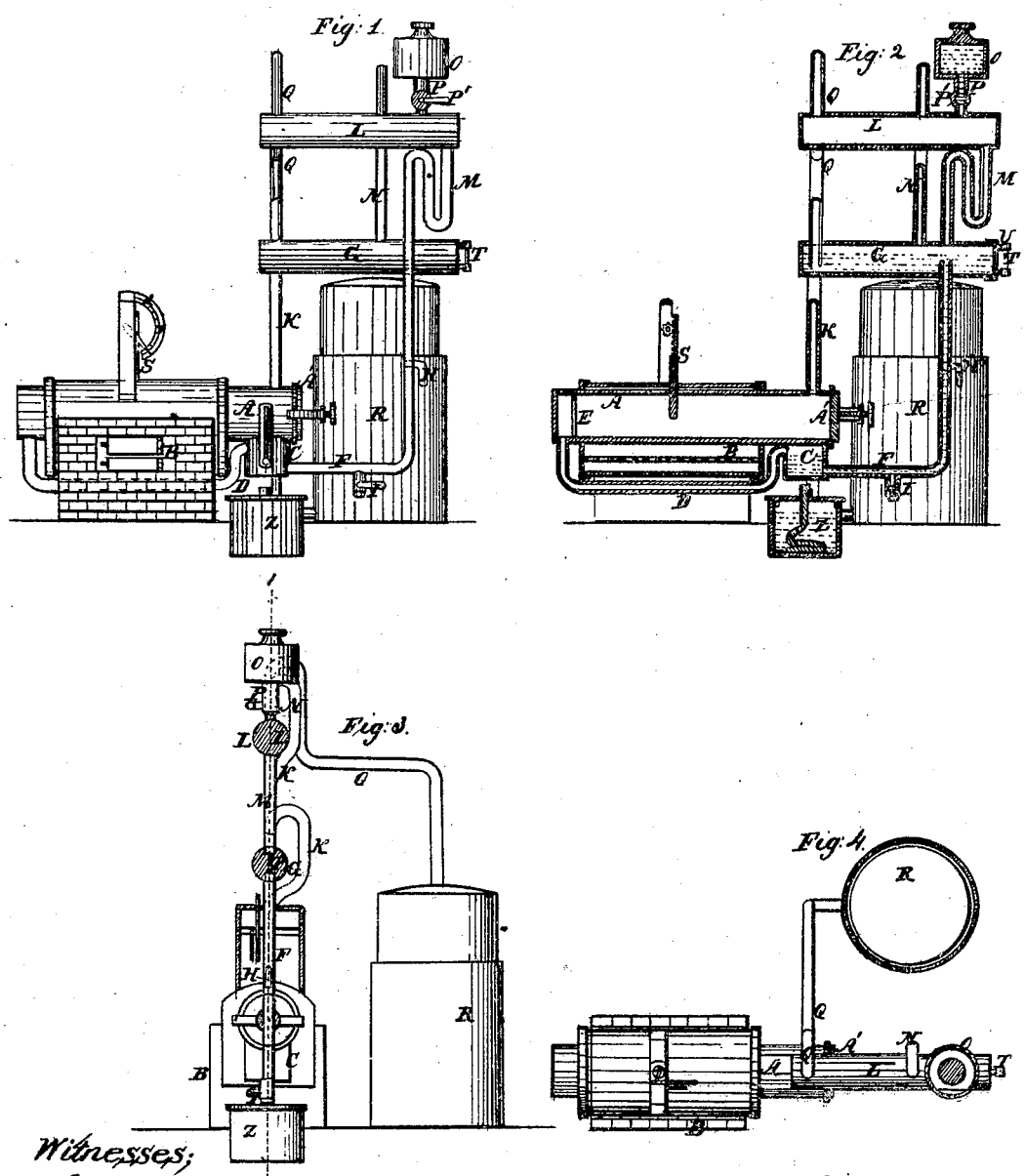

WILLIAM ELMER, OF NEW YORK, N. Y.

IMPROVEMENT IN APPARATUS FOR PRODUCING OLEFIANT GAS.

Specification forming part of Letters Patent No. 39,387, dated August 4, 1863; antedated May 13, 1863.

*To all whom it may concern:*

Be it known that I, WILLIAM ELMER, M. D., of the city, county, and State of New York, have invented a new and useful Apparatus for Producing Olefiant Gas and Oxide of Zinc; and I do hereby declare that the following is a full, clear, and exact description of the same, reference being had to the accompanying drawings, making part of the specification.

Figure 1 is a front elevation of the apparatus. Fig. 2 is a vertical longitudinal section of the same at the red line 1 2 of Fig. 3. Fig. 3 is an end elevation of the same. Fig. 4 is a top or bird's-eye view of the same.

Similar letters in the figures refer to corresponding parts.

The nature of this invention consists in the construction of an apparatus by which naphtha or benzole (or analogous substances) and water in suitable proportions are conveyed into a preheater and converted into vapors, which are thence conveyed into a highly-heated retort containing a proportionate quantity of granulated zinc in such a manner as to decompose the water and naphtha or benzole and cause the oxygen of the former to unite with the zinc and form an oxide with this metal, and the hydrogen to be set free, and the hydrogen of the naphtha or benzole to be also liberated by the heat, and the carbon to be brought into the nascent state, in which condition the hydrogen in said retort instantly combines in the exact proportion with the carbon to form olefiant gas, as is more fully described in my application for a patent for "improvement in the production of olefiant gas," entered in the Patent Office on the same date as the entry of this present application.

To enable others skilled in the art to make and use my invention, I will proceed to describe its construction and operation.

A is a gas-retort in which the granulated zinc is placed, provided with the usual movable head, A, and firmly set and secured in a suitable furnace, B.

C is a vessel arranged under one end of the gas-retort, in which vessel the water and benzole or naphtha are preheated and converted into vapors, and from which they are conveyed through a pipe, D, extending from the upper part of the preheater under the furnace B, into the opposite end of the gas-retort, a perforated diaphragm or sieve, E, being interposed in the retort between the portion where the pipe D communicates with the retort and the portion containing the granulated zinc, for dividing the vapors into streams, and thus bringing them more thoroughly in contact with the heated zinc in the retort, to enable it to act better upon them.

Z is a lamp for heating the preheater.

F is a pipe extending from the lower part of the preheater or vessel C, with which it communicates horizontally a short distance, and thence vertically through the lower part of a horizontal cylinder, G, inside of which it terminates at about the center, so as to prevent the oxide of zinc descending through it, as will be hereinafter described.

H I are cocks or valves, the one, H, in the upright portion of the pipe F being designed for regulating the flow of the naphtha or benzole and water from the preheater and communicating pipe F and cylinder G when required.

K is a gas pipe communicating with the upper end of the retort, and extending therefrom above the cylinder G, and passing through the top of the same, to very near its lower part, below the surface of the naphtha or benzole and water contained therein.

L is another horizontal cylinder similar to cylinder G, immediately above which it is arranged. This cylinder communicates with the lower cylinder, G, by means of two gas-pipes, M N, the first pipe, M, extending from near the end of the cylinder G upward, and then curved downward, and curved again upward to the end of the cylinder L, the downward and upward curved course given it being designed as a trap to always keep these portions filled with naphtha or benzole and water, to prevent the gas passing through this pipe from the lower to the upper cylinder. The other pipe, N, extends from the top of the lower cylinder, G, upward and around the upper cylinder, L, with the upper part of which it communicates.

O is the reservoir, in which the naphtha or benzole and water are first placed, and from whence they descend through a pipe, P, into the upper cylinder, L, said pipe having a cock or valve, P, in it to regulate the supply of the naphtha or benzole and water to the cylinder L, and consequently to the cylinder G, Q is an elbowed pipe extending from the top and end of the upper cylinder, L, with which it communicates, to the lower part of the usual-formed gasometer R.

S is a pyrometer for ascertaining and regulating the degree of heat in the retort.

T is a glass tube for ascertaining the quantity of naphtha or benzole and water in the cylinder G.

W is a thermometer indicating the degree of heat in the preheater.

The operation of the apparatus is as follows: The naphtha or benzole and water, in the proportions of ten pounds of the former to six and one-third pounds of the latter, are placed in the reservoir O and mechanically mixed, and, by means of the cock or valve P, are allowed to descend into the upper cylinder, L, and through the curved pipe M into the cylinder G, and thence through the pipe F into the preheater G, the quantity admitted to the said preheater and the upper cylinder being respectively regulated by the cocks or valves P H, so as to keep the cylinder G about two-thirds full at all times. The vapors from the preheater pass through the pipe D and through the diaphragm or sieve in streams, and, coming in contact with the heated zinc, olefiant gas and oxide of zinc are produced, as before described, which gas passes through the pipe K, whose end terminates below the surface of the naphtha or benzole and water in the cylinder G, causing the said gas to pass through the mixture in the cylinder G, by which means the fluids are kept in constant motion, whereby a perfect mechanical mixture of the same is maintained. The oxide of zinc is collected in proper vessels for the purpose, while any floating particles of the same that may have passed over with the gas are precipitated in the cylinder G, below the mouth or end of the pipe F, by which means it is prevented from descending through it.

The oxide of zinc thus precipitated is withdrawn from the cylinder G by removing its detachable head V. The gas then passes through the pipe N into the upper cylinder, L, where the condensable vapors which may have escaped decomposition may be liquefied and again returned to the cylinder G. The gas in its course passes through the pipe Q into the gasometer R.

The intensity of the flame and the quantity of gas produced exhibits fully the extent of the process, and enables the operator, by a little practice, to judge if more or less heat, &c., be required, and the exact temperature, when obtained, may be maintained, as indicated by the pyrometer. The apparatus, if constructed on a large scale, is built in brick-work after the manner of gas-works.

For small apparatus the retort may be placed in a furnace or stove.

The preheater or vaporizer, if desired, may form a part of the gas-retort itself by interposing a partition or other means to separate the two.

What I claim, and desire to secure by Letters Patent, is—

Constructing the apparatus for producing pure olefiant gas and oxide of zinc by arranging contiguous and indirect connection and communication with the retort A for containing granulated zinc, and the preheater Z for converting naphtha or benzole and water into vapors, and arranging and combining therewith the several gas-pipes, D F K N M P Q, cocks I H P, cylinders G L, and reservoir O, for performing the respective functions before described, the several parts operating distinctively to produce the desired results, substantially in the manner herein set forth.

WILLIAM ELMER.

Witnesses:
E. MAHER,
ROBERT J. TRESCOTT.